US012694305B2

(12) United States Patent (10) Patent No.: US 12,694,305 B2
Chen et al. (45) Date of Patent: Jul. 28, 2026

(54) DIFFERENTIABLE METHOD FOR MINING CONSTANT RULES

(71) Applicant: ZHEJIANG UNIVERSITY, Hangzhou (CN)

(72) Inventors: Huajun Chen, Hangzhou (CN); Zezhong Xu, Hangzhou (CN); Peng Ye, Hangzhou (CN); Wen Zhang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 525 days.

(21) Appl. No.: 18/279,865

(22) PCT Filed: Sep. 23, 2022

(86) PCT No.: PCT/CN2022/120842
§ 371 (c)(1),
(2) Date: Aug. 31, 2023

(87) PCT Pub. No.: WO2023/051400
PCT Pub. Date: Apr. 6, 2023

(65) Prior Publication Data
US 2024/0160961 A1 May 16, 2024

(30) Foreign Application Priority Data

Sep. 29, 2021 (CN) .......................... 202111150589.X

(51) Int. Cl.
*G06N 5/025* (2023.01)
(52) U.S. Cl.
CPC .................................... *G06N 5/025* (2013.01)
(58) Field of Classification Search
None
See application file for complete search history.

(56) References Cited

U.S. PATENT DOCUMENTS 10,229,195 B2 * 3/2019 Ho .......................... G06F 40/10
10,496,749 B2 * 12/2019 Krishnamurthy ..... G06F 40/211
(Continued)

FOREIGN PATENT DOCUMENTS

CN 111126828 5/2020
CN 112612903 4/2021
(Continued)

OTHER PUBLICATIONS

Kholod et al. "Unification of Mining Model for Parallel Processing", 2017 IEEE, pp. 450-455.*
(Continued)

*Primary Examiner* — Maikhanh Nguyen
(74) *Attorney, Agent, or Firm* — Jiwen Chen; Joywin IP Law PLLC

(57) ABSTRACT

Disclosed in the present invention is a differentiable method for mining constant rules. On the basis of defining constant operators and path operators according to a knowledge graph, a fusion attention mechanism is used to evaluate relations passed by rules by using attention values. Meanwhile, attentions are calculated by aggregating surrounding attributes and the corresponding attribute values for tail node of each hop respectively. Attentions of the attributes are used to enhance selection of relations in the rules to achieve link prediction. According to generated model parameters, high quality symbolic rules are output by parameter analysis and statistics. This method is particularly suitable for application scenarios with complex reasoning requirements that require high prediction accuracy, provide interpretations for predictions, and need to precipitate reasoning rules.

8 Claims, 3 Drawing Sheets

Obtaining a knowledge graph and constructing path operators and constant operators based on the knowledge graph Using a bidirectional long short-term memory model to extract vector sequences of the relations in a target triplet According to the vector sequences extracted from the bidirectional long short-term memory model, performing attention mechanism processing to obtain attention parameters corresponding to the path operators and the constant operators Perform rule interference according to according to the first attention parameter, the second attention parameter, the path operator, and the constant operator Analyzing and generating a plurality of rules for each target relation according to the first attention parameters, the second attention parameters, and the third attention parameters Screening a plurality of rules of a plurality of target relations to determine and output final extraction rules

(56) References Cited

U.S. PATENT DOCUMENTS

| 11,288,593 B2* | 3/2022 | Sun .................... G06F 40/169 |
| 11,354,841 B2* | 6/2022 | Zhou .................... G10L 25/24 |
| 11,625,573 B2* | 4/2023 | Gliozzo ................ G06F 40/30 |
| | | 706/15 |
| 2016/0140016 A1* | 5/2016 | Li .................... G06F 11/3612 |
| | | 714/38.1 |
| 2018/0039695 A1* | 2/2018 | Chalabi ................ G06N 5/022 |
| 2019/0122145 A1 | 4/2019 | Sun et al. |
| 2020/0073932 A1* | 3/2020 | Jia .................... G06F 16/9024 |
| 2020/0073933 A1 | 3/2020 | Zhao et al. |
| 2020/0279080 A1* | 9/2020 | Cao .................... G06N 3/044 |
| 2021/0279606 A1* | 9/2021 | Srinivasan ............ G06N 3/091 |

FOREIGN PATENT DOCUMENTS

| CN | 113010691 | 6/2021 |
| CN | 113282612 | 8/2021 |
| CN | 113377968 | 9/2021 |

OTHER PUBLICATIONS

Pannonia et al. "Process Development Based on Model Mining and Experiment Design Techniques", 2010 IEEE, pp. 171-176.*
Chen et al. "Knowledge Graph Completion: A Review", 2020 IEEE, 22 pages.*
Hanga et al. "A Graph-Based Approach to Interpreting Recurrent Neural Networks in Process Mining", 2020 IEEE, 16 pages.*

* cited by examiner

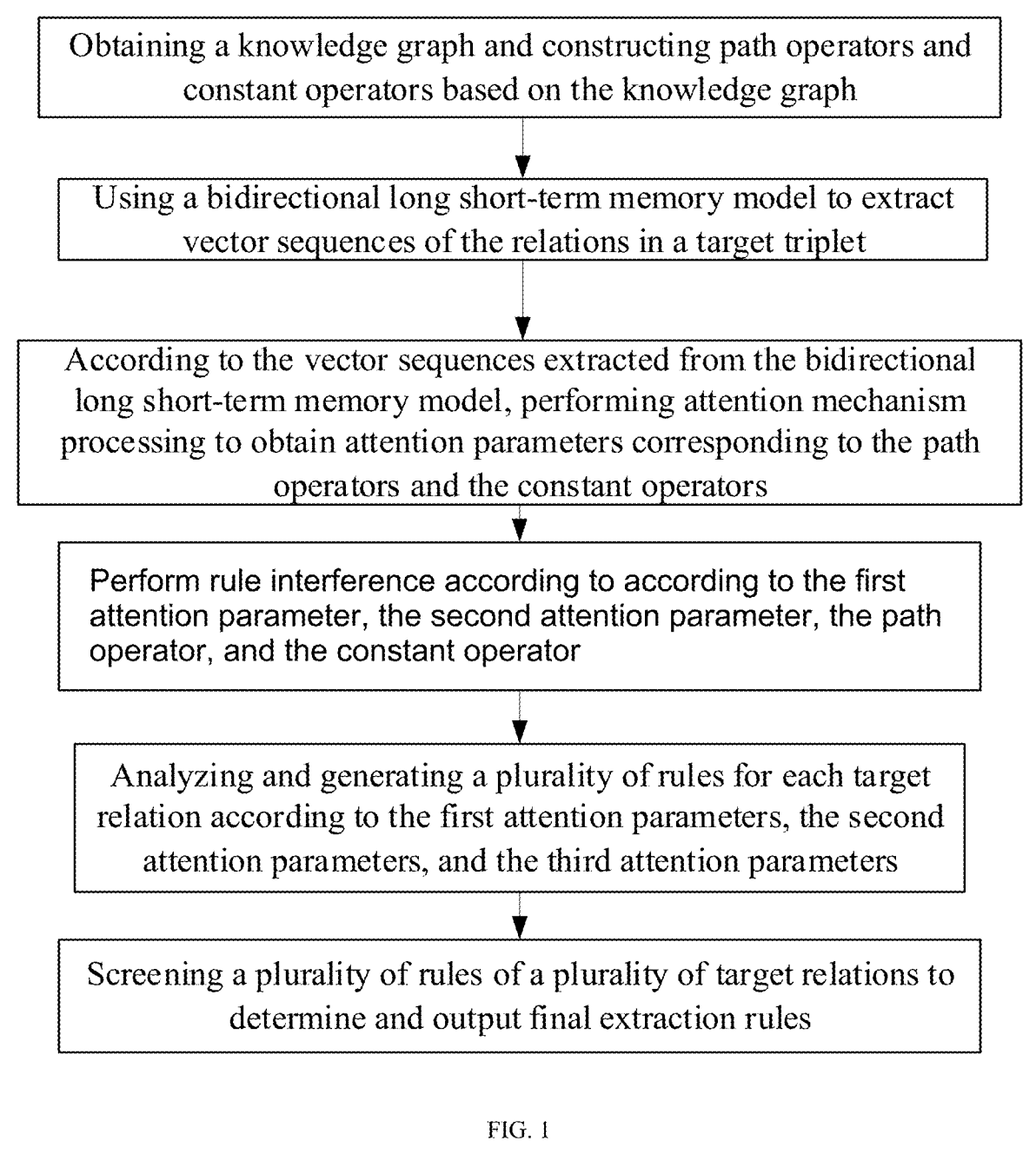

Obtaining a knowledge graph and constructing path operators and constant operators based on the knowledge graph Using a bidirectional long short-term memory model to extract vector sequences of the relations in a target triplet According to the vector sequences extracted from the bidirectional long short-term memory model, performing attention mechanism processing to obtain attention parameters corresponding to the path operators and the constant operators Perform rule interference according to according to the first attention parameter, the second attention parameter, the path operator, and the constant operator Analyzing and generating a plurality of rules for each target relation according to the first attention parameters, the second attention parameters, and the third attention parameters Screening a plurality of rules of a plurality of target relations to determine and output final extraction rules

FIG. 1

DIFFERENTIABLE METHOD FOR MINING CONSTANT RULES

This is a U.S. national stage application of PCT Application No. PCT/CN2022/120842 under 35 U.S.C. 371, filed Sep. 23, 2022 in Chinese, claiming priority of Chinese Application No. 202111150589.X, filed Sep. 29, 2021, all of which are hereby incorporated by reference.

FIELD OF TECHNOLOGY

The present invention belongs to the technical field of knowledge graph reasoning, and in particular relates to a differentiable method for mining constant rules.

BACKGROUND TECHNOLOGY

Traditional knowledge graph embedding representation learning methods mostly use triplets of head entities, relations and tail entities as inputs, calculate triplet scores through certain assumptions, such as h+r=t, and optimize model embedding vectors. The calculation processes are completed in one step, and connection prediction results only give tail entities without giving steps, so most of them are black box models with poor interpretability. For example, a Chinese patent document CN113377968A discloses a knowledge graph link prediction method using entity context fusion.

Traditional knowledge graph rule mining models are mostly based on search and matching on graphs, and rule mining is a search statistical process rather than a computational process. For a large knowledge graph, search space increases dramatically, so does consumption of time and hardware resources. Meanwhile, they only consider associations from relations to relations, and do not note that attributes connected by intermediate entities also affect rules themselves. For example, a Chinese patent document with a public number CN111126828A discloses a multi-layer abnormal fund flow monitoring method based on a knowledge graph.

In summary, the existing methods about reasoning over knowledge graph have their own limitations, the traditional knowledge graph embedding representation learning models can only complete prediction tasks, and reasoning processes are black boxes, which cannot provide explanations for predicted results or parse out predicted rules. The traditional rule mining models aim to produce symbolic rules, but cannot restrict the corresponding attributes of nodes. For example, for a 'parent' relation of a person, if gender is male, it corresponds to the 'father' relation, and if the gender is female, it corresponds to the 'mother' relation. Taking into account the attributes allows the relations themselves to be fine-grained.

Meanwhile, among existing demands, the knowledge graph reasoning not only requires high accuracy, but also requires an algorithm to provide explanations for the predicted results and generate the symbolic rules. This can not only help experts judge rationality of the predicted results, find a relation that is not found at present, but also avoid re-calculation and multi-times of developments due to new added entities, so as to broaden an application scope of the models.

SUMMARY OF THE INVENTION

In view of the above, the present invention provides a differentiable method for mining constant rules, which is suitable for prediction application scenarios where constants need to be considered to improve accuracy. This method also provides interpretation of symbolic rules, avoids recalculation due to new added entities, thus reducing a computation cost.

A technical solution provided by an embodiment is as follows:

A differentiable method for mining constant rules, wherein the method comprises the following steps:

step 1: obtaining a knowledge graph, constructing a path operator for each relation according to the knowledge graph, so as to represent a connection situation of each relation in entities; and, constructing a constant operator for a combination of each relation and entity according to the knowledge graph, so as to represent situations of all possible constants connected to the entity through the relations;

step 2: after initializing a target relation of a target triplet as a relation vector, repeatedly inputting the relation vector into a bidirectional long short-term memory model for 2T times according to an expected rule length T, and obtaining 2T vector sequences with a fixed length;

step 3: extracting T vector sequences with the fixed length for performing first attention mechanism processing to obtain first attention parameters of the path operators when a T-step rule extraction is used; extracting the remaining T vector sequences with the fixed length for performing second attention mechanism processing to obtain second attention parameters of the constant operators when the T-step rule extraction is used;

step 4: for each step of rule extraction, firstly expanding a rule path according to the path operator, that is, predicting a node entity according to the path operator and the corresponding first attention parameter, and then judging whether the rule requires a constant according to the constant operator, that is, taking the predicted node entity as a basis, using the constant operator and the corresponding second attention parameter to predict a node entity considering the constant;

step 5: according to the parsing of the first attention parameter and the second attention parameter, and a prediction intermediate parameter in a rule extraction process of step 4, generating a plurality of rules for each target relation; and step 6: screening all rules of a plurality of target relations to determine and output final extraction rules.

Compared with the prior work, the present invention has at least the following beneficial effects:

At present, a differentiable method for mining constant rules provided by the embodiment is the only technical solution that can simultaneously possess high prediction accuracy, the ability to provide constraint constant interpretation and the ability to parse into the symbolic rules. The method adopts the fusion attention mechanism and uses the attention value to evaluate the relationships passed by the rules. Meanwhile, the attentions are respectively calculated by aggregating the surrounding attributes and corresponding attribute values of each step, and the attention of the attributes is used to enhance the selection of relations in the rules. It is especially suitable for the application scenarios that require constant constraints and can be resolved into symbolic rules and require high prediction accuracy and have compound reasoning requirements, such as the application of commodity attributes to the e-business scenario. If the rules with constants can be resolved according to the attributes, the recommendation scenario of each product can be reasoned directly according to this rule, eliminating the manual marking steps, and for new users without shopping or search records, specific products can be directly recommended according to the attributes in their user portraits to avoid the cold start problem.

BRIEF DESCRIPTION OF THE DRAWINGS

In order to illustrate the embodiments of the present invention or the technical solution in the prior art more clearly, the following briefly introduces accompanying drawings required to be used in the description of the embodiments or the prior art. Obviously, the drawings in the following description are only some embodiments of the present invention. For those of ordinary skill in the art, other drawings can also be obtained from these drawings without creative efforts.

FIG. 1 is a flow chart of a differentiable method for mining constant rules provided by an embodiment of the present invention;

DETAILED DESCRIPTION OF THE EMBODIMENTS

Figure 2:
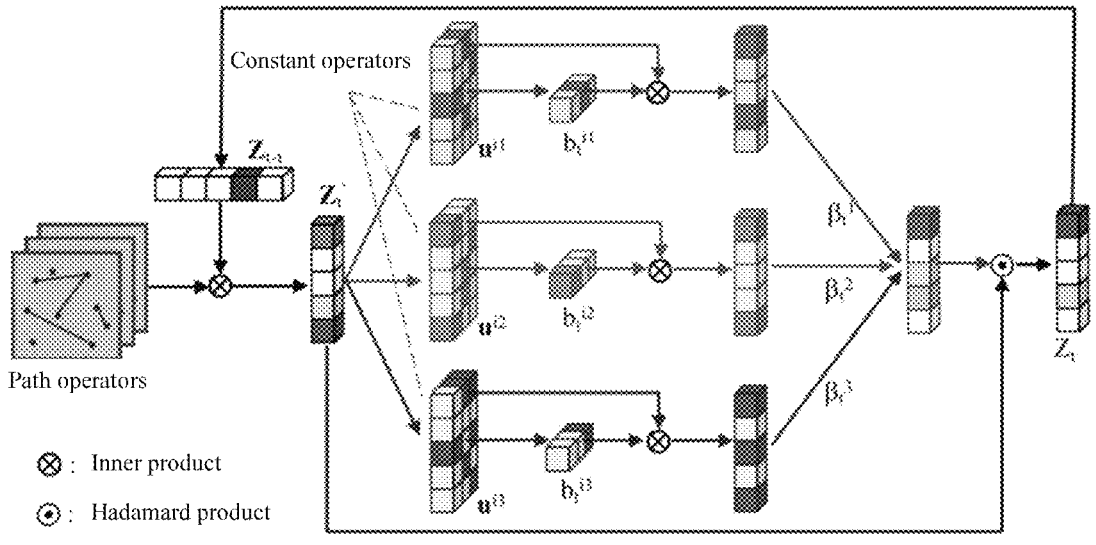
FIG. 2 is a schematic diagram of a process of judging whether rules require constants according to constant operators provided by the embodiment of the present invention.

In order to make the purpose, technical solution and advantages of the present invention more clearly understood, the present invention is further explained in detail in the following combined with accompany drawings and embodiment. It should be understood that the specific implementation described herein is intended only to explain the present invention and does not limit the protection scope of the present invention.

FIG. 1 is a flow chart of a differentiable method for mining constant rules provided by an embodiment of the present invention. As shown in FIG. 1, the embodiment provides a differentiable method for mining constant rules, wherein the method comprises the following steps:

Step 1: obtaining a knowledge graph and constructing path operators and constant operators based on the knowledge graph.

In the present embodiment, triplet information (h, r, t) of the obtained knowledge graph forms a relation set R and an entity set E, and according to the relation set R and the entity set E, a path operator is constructed for each relation In order to facilitate the construction of path operators, the knowledge graph is constructed as a dictionary with relations as key values and pointing head nodes as a tail node list corresponding to the key values. Based on the dictionary, the path operator is constructed for each relation $r_i$ which is represented as an adjacency matrix, containing all the entities related to this relation, is used to expand an overall length of the rules. The path operator is represented as $M^{r_i} \in \mathbb{R}^{|E| \times |E|}$, element values of $M^{r_i}$ are 1 or 0, wherein 1 represents that there is a relation $r_i$ between two entities, and 0 represents that there is not the relation $r_i$ between the two entities. It should be noted that a special relation path operator is also defined, whose values on a diagonal are 1, which represents a relation between an entity and itself. The relation is generally not directly and explicitly described in the knowledge graph. Therefore, there are a total of $|R|+1$ path operators.

In the embodiment, the constant operator is constructed for each combination of relation and entity according to the knowledge graph to represent other possible constants connected to the entity through the relation. The constant operator is used to define a constant constraint required by an intermediate step of the rule. In the embodiment, the constant is the entity, which is called the constant in order to distinguish and facilitate description. For a combination of relation $r_i$ and a kth entity $e_k$, the constructed constant operator is represented as $u^{ik} \in \mathbb{R}^{|E| \times 1}$, and each element has a value of 1 or 0, wherein 1 represents that the entity $e_k$ is connected to other possible constants e by the relation $r_i$, and 0 represents that the entity $e_k$ cannot find other possible connected constants e by the relation Since there are $|E|*|R|$ such combinations in the entire knowledge graph, there are a total of $|E|*|R|$ constant operators.

Step 2: using a bidirectional long short-term memory model to extract vector sequences of the relations in a target triplet.

In the embodiment, an expected rule length T is preset, and a relation vector of the target triplet is randomly initialized, wherein the relation vector corresponds to all relations one by one, that is, the dimension of the relation vector is equal to the number of relations in the relation set R.

The relation vector is repeatedly inputted into a bidirectional long short-term memory model (BiLSTM) for 2T times according to the expected rule length T, and 2T vector sequences with a fixed length are obtained. A specific process is as follows:

$$h_0, h'_{2T} = BiLSTM(r)$$

$$h_t, h'_{2T-t-1} = BiLSTM(r, h_{t-1}, h'_{2T-t}), t > 1$$

wherein t is an index of the step, r is the relation vector, h represents a vector sequence obtained by forward calculation, and h' represents a vector sequence obtained by reverse calculation.

Step 3: according to the vector sequences extracted from the bidirectional long short-term memory model, performing attention mechanism processing to obtain attention parameters corresponding to the path operators and the constant operators.

In this embodiment, T vector sequences with the fixed length are extracted for performing first attention mechanism processing to obtain first attention parameters of the path operators when a T-step rule extraction is used; the remaining T vector sequences with the fixed length are extracted for performing second attention mechanism processing to obtain second attention parameters of the constant operators when the T-step rule extraction is used.

In one possible implementation, a fully connected layer is used for performing the attention mechanism processing on the vector sequences, which is specifically as follows:

$$\alpha_t = \text{Softmax}(W_a(h_t + h'_t) + b_a), t = 1, 3, \ldots, 2T - 1$$

$$\beta_t = \text{Softmax}(W_b(h_t + h'_t) + b_b), t = 2, 4, \ldots, 2T$$

wherein t is an index of the step, $\alpha_t$ represents the first attention parameter of the path operator, $\beta_t$ represents the second attention parameter of the constant operator, $h_t$ and $h'_t$ respectively represent two vector sequences outputted by the bidirectional long short-term memory model at step t; $W_a$ and $b_a$ respectively represent a weight parameter and a bias parameter in the first attention processing; $W_b$ and $b_b$ respectively represent a weight parameter and a bias parameter in the second attention processing; and Softmax(•) is a Softmax function. Parameters $W_a$, $b_a$ and $W_b$, $b_b$ need to be optimized. The above formulas indicate that vector sequences of odd steps are extracted to compute the first attention parameters $\alpha_t$ of the path operators and vector sequences of even steps are extracted to compute the second attention parameters $\beta_t$ of the constant operators.

Step 4: performing rule reasoning based on the first attention parameters, the second attention parameters, the path operators, and the constant operators.

In this embodiment, for a rule with a maximum length of T, each step of rule extraction requires a two-step operation using the path operators and the rule operators, which comprises: firstly expanding rule paths according to the path operators, that is, predicting node entities according to the path operators and the corresponding first attention parameters, and then judging whether the rules require a constant according to the constant operators, that is, taking the predicted node entities as a basis, using the constant operators and the corresponding second attention parameters to predict the node entities considering the constant.

In one possible implementation, the process of expanding rule paths according to the path operators comprises:

Node entities are predicted based on the path operators and the corresponding first attention parameters:

$$z'_t = z_{t-1} \times \sum_{i=0}^{|R|} \alpha_t^i M^{r_i}$$

wherein $z_{t-1}$ represents a node entity that takes constant prediction into account at step t-1; $M^{r_i}$ represents a path operator of an i-th relation $$r_i; \alpha_t^i$$

represents a first attention parameter of the path operator of the relation $r_i$ at step $$t; z'_t$$

represents an expansion result of the rule path, that is, the predicted node entity;

$$\sum_{i=0}^{|R|} \alpha_t^i M^{r_i}$$

is a prediction relation; and when t=1, $z_{t-1}$ is a target head entity vector in a target triplet.

The essence of the expansion process of the rule paths is to find a neighbor entity of $z_{t-1}$ of the predicted result through the path operator $M^{r_i}$. Because the first attention parameter $$\alpha_t^i$$

of the path operator $M^{r_i}$ is different, a weight of the neighbor entity formed by $$\sum_{i=0}^{|R|} \alpha_t^i M^{r_i}$$

would be different. The weighted summation of the first attention parameters $$a_t^i$$

of the path operators $M^{r_i}$ is used to construct the weight of the neighbor entity, which fully considers all the relations in the knowledge graph, realizes the expansion of the rule paths, and can obtain the multi-path of the rule extraction.

In one possible implementation, as shown in FIG. 2, the process of judging whether rules require constants based on the constant operators comprises:

First, for a constant operator $u^{ik}$ corresponding to an i-th relation $r_i$, multiplying the constant operator with a node entity prediction result $$z'_t$$

step t to obtain a third attention parameter $$b_t^{ik}$$

of the constant, i.e., $$b_t^{ik} = z'_t \cdot u^{ik};$$

The third attention parameter, as the attention of the constant, is concerned with a degree of association between the node entity and the constant at each step, which is used to select the constant and realize the restriction on the constant.

Then, all constant operators $u^{ik}$ corresponding to the i-th relation $r_i$ are aggregated weighted using the third attention parameter $$b_t^{ik},$$

and the aggregated constant operator $$u_t^i$$

is obtained, namely:

$$u_t^i = \text{Scale}\left(\sum_{k=1}^{|E|} b_t^{ik} \cdot u^{ik}\right)$$

wherein k is an index of the constant, the purpose of Scale(•) is to control each value of the weighted vector between (0, 1); and a constant aggregation process is used to screen for relatively strong constant relations.

Finally, based on the node entity prediction results $$z_t',$$

the node entity prediction considering the constants is performed according to the second attention parameters $$\beta_t^i$$

of the constant operators and the aggregated constant operator $$u_t^i,$$

namely:

$$z_t = z_t' \odot \sum_{i=0}^{|R|} \beta_t^i \cdot u_t^i$$

wherein, $z_t$ represents the node entity that considers the constants; $\odot$ represents a Hadamard product, that is, the multiplication of two vectors by bits; meanwhile, when $$i = 0, u_t^i$$

would be set as an all-1 vector, indicating that this step does not need to consider any constant.

Since the maximum value of rule length is T, above steps 3-4 need to be repeated T times to obtain a constant prediction result $z_T$ from a head entity vector h, wherein the constant prediction result $z_T$ is a predicted probability distribution of the entity, and the value at each position represents the probability of the entity at the corresponding position.

It should be noted that the bidirectional long short-term memory model in step 2 and the attention mechanism in step 3 need parameter optimization before mining constant rules. A specific parameter optimization process is as follows:

for a sample triplet (h, r, t), after vector initialization of the entities and relations in the sample triplet, the process of step 2-step 4 is used to obtain a constant prediction result, and an evaluation score score(t|h,r) of the reasoning result is calculated according to the prediction result $z_T$ and a real tail entity vector t in the sample triplet, namely:

$$\text{score}(t|h, r) = t \cdot \log[z_T, \tau]_+$$

wherein $\tau$ represents a set filtering threshold; the values in $z_T$ which are less than $\tau_{[j]}$ are filtered out; a sum of evaluation scores of all sample triplets in a training batch is taken as a loss function, and the parameter optimization is performed with a goal of maximum loss function.

Step 5: analyzing and generating a plurality of rules for each target relation according to the first attention parameters, the second attention parameters, and the third attention parameters.

On the basis of completing a rule extraction task, symbolic rules need to be generated by the analysis of the first attention parameters, the second attention parameters and the third attention parameters. As mentioned earlier, $\alpha$ is used to select a path, $\beta$ is used to select a constant relation, and b is used to select a specific constant. Based on this, the process of parsing to generate a plurality of rules for each target relation is as follows:

For rule extraction in each step, a relation of which the value is greater than a first threshold is selected from the first attention parameters according to a preset first threshold as a relation determined by the current step; a relation of which the value is greater than a second threshold is selected from the second attention parameters according to a preset second threshold as a constant relation determined by the current step; and a constant of which the value is greater than a third threshold is selected from the third attention parameters according to a preset third threshold as a constant determined by the current step. In this way, all possible passed concrete paths (formed by relations and constant relations in a step order) and constraint constants can be obtained in the target triplet. Note that there may be a plurality of rules that can reason results for one path. Therefore, the relations, constant relations and constants determined by all steps form the plurality of rules in the step order.

In the embodiment, for the target triplet, the resulting path interpretation of length T is expressed as follows:

$$r^1 \wedge r^2 \dots \wedge r^T \to r$$

wherein each $r^i$ is expressed as $r_j$, $\text{attribute}_j(\text{value}_{jz})$, wherein $\text{attribute}_j(•)$ represents a constant relation between the node entity and the constant, j is an index of the constant relation, $\text{value}_{jz}$ represents a constant determined by the constant relation $\text{attribute}_j$; and z is an index of the constant, that is, a previous hop node entity is connected to a next hop node entity through the relation r. The node entity requires an attribute $\text{attribute}_j$, and the attribute has an attribute value $\text{value}_{jz}$. Herein, value is the constant, and a definite entity is needed in the rules.

Step 6: screening a plurality of rules of a plurality of target relations to determine and output final extraction rules.

For each target triplet, a process of step 2 to step 5 is used to generate the plurality of rules. Finally, all the parsed rules as a whole are counted, and the rules that are applied more frequently in all triplet reasoning processes are selected as the final extraction rules.

In the embodiment, a process of screening a plurality of rules of a plurality of target relations to determine and output final extraction rules is as follows:

For each rule of all target relations, a confidence is calculated according to the first attention parameters, second attention parameters and third attention parameters of each step, and rules with a high confidence are selected as the final extraction rules. Preferably, a rule of which the degree of confidence is higher than a set threshold is selected as a rule that occurs more frequently and output.

A calculation formula of the confidence for each rule is as follows:

$$\omega = \prod_{i=1}^{T} \alpha_{ir} * (1 + \beta_{ia} * u_{ia})$$

wherein i is an index of the step, and T is a preset rule length, that is, the number of steps; $\alpha_{ir}$ is a first attention parameter of the relation r in the path operator at an i-th step; $\beta_{ir}$ is a second attention parameter of the constant relation a in the constant operator at the i-th step, and $u_{ia}$ is an average value of the third attention parameters of all the constants that exceed the parameter threshold under the constant relation $\alpha$ at the i-th step.

The above differentiable method of mining constant rules can firstly use a neural network to reason the triplets; secondly, it can parse the symbolic rules from the model parameters; and finally an overall framework is implemented in a differentiable way, which provides the basis for the use of the neural network to reason.

Different from a previous rule learning reasoning method for differentiable reasoning on a relatively simple chain, the method provided by the embodiment of the present invention considers a more complex rule form, introduces the constants as a constraint condition into the rules, and uses attention values to simulate overall rule paths to facilitate generating the interpretations. At least one rule can be generated for each triplet prediction, and the framework of this method is backward compatible with constant-free rule forms. This method is particularly suitable for application scenarios with complex reasoning requirements that require high prediction accuracy, provide interpretations for predictions, and need to precipitate reasoning rules.

The embodiment provides a differentiable method of mining constant rules, which is suitable for prediction application scenarios that need to consider the constants to improve the accuracy. In an e-business scenario, the knowledge graph corresponds to a commodity knowledge graph applicable to the e-business scenario, wherein the entities represent commodities and attributes; and the relations represent relations between the commodities and the attributes; and a goal of rule mining is to find which scenarios or groups of people are suitable for goods with certain attributes. The commodity attributes have strong effects on the rule reasoning in the e-business scenario, and the attribute values in this scenario can be regarded as the constants. For example, it can be considered that a package with a leather attribute is more suitable for a business scenario, and there are few types of relations between different commodities in the e-business scenario. On the contrary, there are a large number of attributions that can be regarded as the constants, resulting in an application value of rules with the constants defined by the present invention being much greater than the rule forms defined by the traditional methods in this scenario.

To verify the technical effects of the differentiable method for mining constant rules provided by the above embodiments, the following specific tests are carried out:

In a training process, an Adam optimizer is used for optimization, and 4 training iterations are carried out. A size of batch in each iteration is set to 14, the dimensions of BiLSTM and full connected function are both set to 256, and a learning rate is set to 0.0001. The performance of the model is evaluated using MRR, Hit@10, Hit@3, and Hit@1, and entities that are correct in addition to the predicted entities are excluded from a scoring range.

The MRR represents a reciprocal mean of the ranking of the correct entities in the probabilities of the predicted results. The Hit@10, Hit@3, and Hit@1 represent the probabilities that the correct entities are in the top ten, top three, and first place in the probabilities of the predicted results.

The effects of connection prediction on the target of FB15K-237 data set are shown in Table 1 below:

TABLE 1

| Model | MRR | Hit@10 | Hit@3 | Hit@1 |
|---|---|---|---|---|
| ConvE | 0.325 | 0.501 | 0.356 | 0.237 |
| ComplEx | 0.247 | 0.428 | 0.275 | 0.158 |
| DistMult | 0.241 | 0.419 | 0.263 | 0.155 |
| RotatE | 0.338 | 0.533 | 0.375 | 0.241 |
| Neural-LP | 0.240 | 0.362 | — | — |
| DRUM | 0.343 | 0.516 | 0.378 | 0.255 |
| The present invention | 0.419 | 0.619 | 0.471 | 0.314 |

The ConvE model comes from 《Convolutional 2D Knowledge Graph Embeddings》; the ComplEx model comes from 《Complex Embeddings for Simple Link Prediction》; the DistMult model comes from 《Embedding Entities and Relations for Learning and Inference in Knowledge Bases》; and the RotatE model comes from 《RotatE: Knowledge Graph Embedding by Relational Rotation in Complex Space》; the Neural-LP model comes from 《Differentiable Learning of Logical Rules for Knowledge Base Reasoning》; the DRUM model comes from 《DRUM: End-To-End Differentiable Rule Mining On Knowledge Graphs》. By analyzing Table 1, it can be seen that among all models, the four parameter values of the MRR, Hit@10, Hit@3 and Hit@1 in the method provided by the embodiment of the present invention are higher than those of other models, indicating that the method provided by the embodiment of the present invention has higher prediction accuracy.

Figure 3:
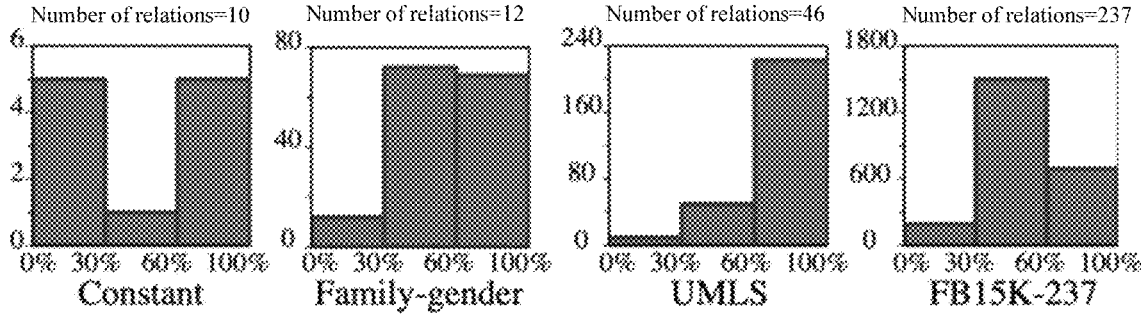
FIG. 3 shows number statistics of rule parsing of different data sets provided by the embodiment of the present invention.

In order to verify that the differentiable method for mining constant rules provided by the embodiment of the present invention can provide interpretation ability, and quality and quantity of the interpretations provided by the model are evaluated. The rules mined on the four data sets of Constant, Family-gender, UMLS and FB 15K-237 are evaluated, and the evaluation results are shown in FIG. 3. In FIG. 3, a horizontal axis represents a confidence interval of the mined rules, while a vertical axis represents the number of rules within the confidence interval. It can be concluded from the analysis of FIG. 3 that the method provided by the embodiment of the present invention mines a large number of rules in a high confidence interval on each data set, indicating that an appropriate number of rules can be mined.

Figure 4:
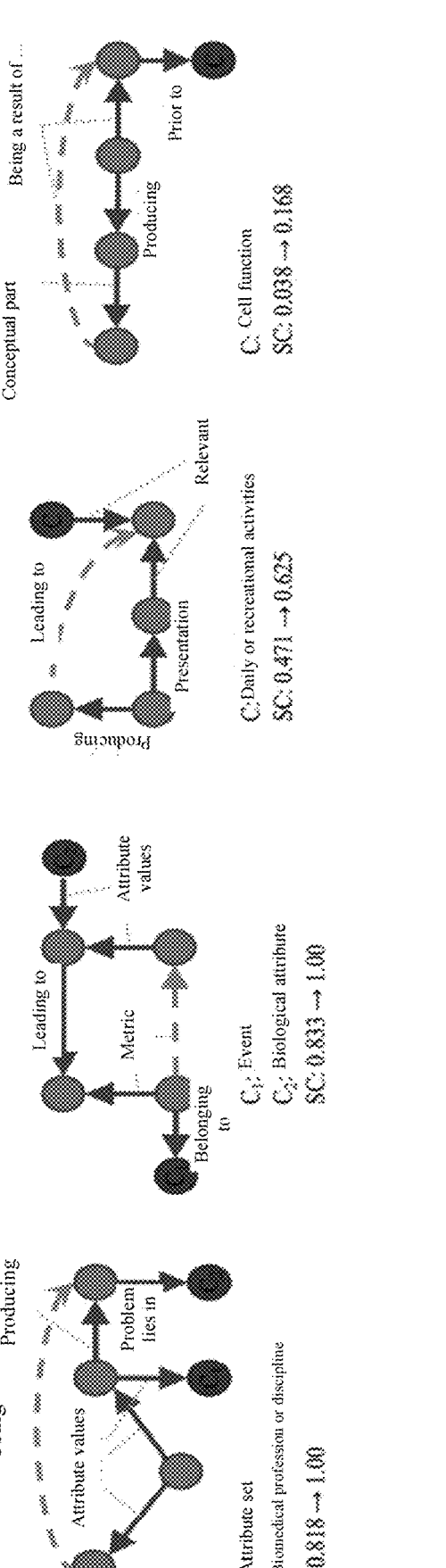
FIG. 4 are some specific examples of the rule parsing provided by the embodiment of the present invention.

In order to evaluate the quality of the rules, the embodiment employs a standard confidence to evaluate the quality. The standard confidence represents a probability that a head relation does exist when the rule body is satisfied, and the standard confidence enhancement represents the standard confidence enhancement when the confidence of the constant in the rules is not considered and the constants are considered. Taking a UMLS data set for medical and biological concepts as an example, FIG. 4 shows samples of the rule results on the UMLS data set. In FIG. 4, circles with C, C1, C2 notations represent constant entities predicted by the constant operators, and the remaining circles represent the node entities predicted by the path operators; a solid arrow represents a relation between two entities, while hollow arrows and "Uses" represent rules obtained through a plurality of relations and through a plurality of entities. As can be seen from FIG. 4, standard confidences SCs are improved. For example, for a first rule, by predicting the constant entity, the standard confidence SC of the rule is improved from 0.818 to 1.00. This fully indicates that the method provided by the embodiment of the present invention can improve the quality of the rules.

The above implementation describes in detail the technical solution and beneficial effects of the present invention. It should be understood that the above implementation is only the most preferred embodiment of the present invention and is not used to limit the present invention. Any modification, supplement and equivalent replacement made within the scope of the principle of the present invention shall be included within the protection scope of the present invention.

The invention claimed is:

1. A differentiable method for mining constant rules, wherein the method comprises the following steps:

step 1: obtaining a knowledge graph, constructing a path operator for each relation according to the knowledge graph, so as to represent a connection situation of each relation in entities; and, constructing a constant operator for a combination of each relation and entity according to the knowledge graph, so as to represent situations of all possible constants connected to the entity through the relations;

step 2: after initializing a target relation of a target triplet as a relation vector, repeatedly inputting the relation vector into a bidirectional long short-term memory model for 2T times according to an expected rule length T, and obtaining 2T vector sequences with a fixed length;

step 3: extracting T vector sequences with the fixed length for performing first attention mechanism processing to obtain first attention parameters of the path operators when a T-step rule extraction is used; extracting the remaining T vector sequences with the fixed length for performing second attention mechanism processing to obtain second attention parameters of the constant operators when the T-step rule extraction is used;

step 4: for each step of rule extraction, firstly expanding a rule path according to the path operator, that is, predicting a node entity according to the path operator and the corresponding first attention parameter, and then judging whether the rule requires a constant according to the constant operator, that is, taking the predicted node entity as a basis, using the constant operator and the corresponding second attention parameter to predict a node entity considering the constant, wherein in step 4, the process of judging whether rules require constants based on the constant operators comprises:

first, for a constant operator $u^{ik}$ corresponding to an i-th relation $r_i$, multiplying the constant operator with a node entity prediction result $$Z_t'$$

of step t to obtain a third attention parameter $$b_t^{ik}$$

of the constant, i.e., $$b_t^{ik} = Z_t' \cdot u^{ik};$$

then, using the third attention parameter $$b_t^{ik}$$

for aggregating and weighting calculation of all constant operators $u^{ik}$ corresponding to the i-th relation $r_i$, and obtaining the aggregated constant operator $$u_t^i,$$

namely:

$$u_t^i = \text{scale}\left(\sum_{k=1}^{|E|} b_t^{ik} \cdot u^{ik}\right)$$

wherein k is an index of the constant, the purpose of Scale(•) is to control each value of a weighted vector to be between (0, 1);

finally, based on the node entity prediction results $$Z_t',$$

performing the node entity prediction considering the constants according to the second attention parameters $$\beta_t^i$$

of the constant operators and the aggregate constant operator $$u_t^i,$$

namely:

$$z_t = z_t' \sum_{i=0}^{|R|} \beta_t^i \cdot u_t^i$$

wherein, $z_t$ represents the node entity that considers the constants; $\odot$ represents a Hadamard product, that is, the multiplication of two vectors by bits; meanwhile, when i=0, $$u_t^i$$

would be set as an all-1 vector, indicating that this step does not need to consider any constant;

step 5: according to the parsing of the first attention parameter and the second attention parameter, and a prediction intermediate parameter in a rule extraction process of step 4, generating a plurality of rules for each target relation; and step 6: screening all rules of a plurality of target relations to determine and output final extraction rules.

2. The differentiable method for mining constant rules according to claim 1, wherein in step 1, triplet information of the obtained knowledge graph forms a relation set R and an entity set E, and according to the relation set R and the entity set E, the path operator constructed for each relation $r_i$ is represented as $M^{r_i} \in \mathbb{R}^{|E| \times |E|}$; element values of $M^{r_i}$ are 1 or 0, where 1 indicates that there is a relation $r_i$ between two entities, and 0 indicates that there is no relation $r_i$ between the two entities; a special path operator of which values on a diagonal are 1 is also defined, which represents a relation between an entity and itself, and there are $|R|+1$ path operators in total;

for a combination of relation $r_i$ and a kth entity $e_k$, the constructed constant operator is represented as $u^{ik} \in \mathbb{R}^{|E| \times 1}$, each element has a value of 1 or 0, wherein 1 represents that the entity $e_k$ is connected to other possible constants e by relation $r_i$, and 0 represents that the entity $e_k$ cannot find other possible constants e by the relation $r_i$, and there are $|E| * |R|$ constant operators in total.

3. The differentiable method for mining constant rules according to claim 1, wherein in step 3, a fully connected layer is used for performing attention mechanism processing of vector sequences, which is specifically as follows:

$$\alpha_t = Softmax(W_a(h_t + h_t') + b_a), t = 1, 3, \ldots, 2T-1$$
$$\beta_t = Softmax(W_b(h_t + h_t') + b_b), t = 2, 4, \ldots, 2T$$

wherein t is an index of the step, $\alpha_t$ represents the first attention parameter of the path operator, $\beta_t$ represents the second attention parameter of the constant operator, $h_t$ and $$h_t'$$

respectively represent two vector sequences outputted by the bidirectional long short-term memory model at step t; $W_a$ and $b_a$ respectively represent a weight parameter and a bias parameter in the first attention processing; $W_b$ and $b_b$ respectively represent a weight parameter and a bias parameter in the second attention processing; and Softmax($\bullet$) is a Softmax function.

4. The differentiable method for mining constant rules according to claim 1, wherein in step 4, the process of expanding rule paths according to the path operators comprises:

predicting node entities according to the path operators and the corresponding first attention parameters:

$$z_t' = z_{t-1} \times \sum_{i=0}^{|R|} \alpha_t^i M^{r_i}$$

wherein $z_{t-1}$ represents a node entity that takes constant prediction into account at step t-1; $M^{r_i}$ represents a path operator of an i-th relation $r_i$;

$$\alpha_t^i$$

represents a first attention parameter of the path operator of the relation $r_i$ at step t; $z_t'$ represents an expansion result of the rule path, that is, the predicted node entity;

$$\sum_{i=0}^{|R|} \alpha_t^i M^{r_i}$$

is a prediction relation; and when t=1, $z_{t-1}$ is a target head entity vector in a target triplet.

5. The differentiable method for mining constant rules according to claim 4, wherein in step 5, the process of parsing to generate a plurality of rules for each target relation is as follows:

for rule extraction in each step, a relation of which the value is greater than a first threshold is selected from the first attention parameters according to a preset first threshold as a relation determined by the current step; a relation of which the value is greater than a second threshold is selected from the second attention parameters according to a preset second threshold as a constant relation determined by the current step; and a constant of which the value is greater than a third threshold is selected from the third attention parameters according to a preset third threshold as a constant determined by the current step; and the relations, constant relations and constants determined by all steps form a plurality of rules in a step order.

6. The differentiable method for mining constant rules according to claim 1, wherein the bidirectional long short-term memory model in step 2 and the attention mechanism in step 3 need parameter optimization before mining the constant rules, and a specific parameter optimization process is as follows:

for a sample triplet (h, r, t), after vector initialization of the entities and relations in the sample triplet, the process of step 2-step 4 is used to obtain a constant prediction result, and an evaluation score score(t|h,r) of the reasoning result is calculated according to the prediction result $z_T$ and a real tail entity vector t in the sample triplet, namely:

$$score(t|h, r) = t \cdot \log[z_T, \tau]_+$$

wherein $\tau$ represents a set filtering threshold; the values in $z_T$ which are less than $\tau$ $\langle\langle\rangle\rangle$ are filtered out; a sum of evaluation scores of all sample triplets is taken as a loss function, and the parameter optimization is performed with a goal of maximum loss function.

7. The differentiable method for mining constant rules according to claim 1, wherein in step 6, a process of screening a plurality of rules of a plurality of target relations to determine and output final extraction rules is as follows:

for each rule of all target relations, a confidence is calculated according to the first attention parameters, second attention parameters and third attention parameters of each step, and rules with a high confidence are selected as the final extraction rules.

8. The differentiable method for mining constant rules according to claim 7, wherein a confidence calculation formula for each rule is as follows:

$$\omega = \prod_{i=1}^{T} \alpha_{ir} * (1 + \beta_{ia} * u_{ia})$$

wherein i is an index of the step, and T is a preset rule length, that is, the number of steps; $\alpha_{ir}$ is a first attention parameter of the relation r in the path operator at an i-th step; $\beta_{ir}$ is a second attention parameter of the constant relation a in the constant operator at the i-th step, and $u_{ia}$ is an average value of the third attention parameters of all the constants that exceed the parameter threshold under the constant relation a at the i-th step.

\* \* \* \* \*